US010113769B2

(12) United States Patent
Crowley

(10) Patent No.: US 10,113,769 B2
(45) Date of Patent: Oct. 30, 2018

(54) WALL MOUNT BRACKET FOR OUTDOOR EQUIPMENT

(71) Applicant: Quick-Sling Holdings, LLC, Duluth, GA (US)

(72) Inventor: William J. Crowley, East Freetown, MA (US)

(73) Assignee: Quick-Sling, LLC, Duluth, GA (US)

( * ) Notice: Subject to any disclaimer, the term of this patent is extended or adjusted under 35 U.S.C. 154(b) by 38 days.

(21) Appl. No.: 14/928,174

(22) Filed: Oct. 30, 2015

(65) Prior Publication Data
US 2016/0123625 A1 May 5, 2016

Related U.S. Application Data

(60) Provisional application No. 62/072,507, filed on Oct. 30, 2014.

(51) Int. Cl.
F16M 13/02 (2006.01)
F24F 13/32 (2006.01)
E04G 5/06 (2006.01)

(52) U.S. Cl.
CPC ............. F24F 13/32 (2013.01); E04G 5/062 (2013.01); F16M 13/02 (2013.01)

(58) Field of Classification Search
CPC . F24F 13/32; E04G 5/062; E04G 5/06; F16M 13/02
USPC .... 211/18, 90.01, 90.04; 248/208, 209, 236, 248/674, 675, 235, 250, 636; 52/712, 52/713, 655.1, 656.9; 312/351.1, 351.3
See application file for complete search history.

(56) References Cited

U.S. PATENT DOCUMENTS

| 493,596 | A | | 3/1893 | McLeran |
| 685,689 | A | | 10/1901 | Milikan |
| 867,661 | A | | 10/1907 | Keating |
| RE13,036 | E | * | 11/1909 | Humphries ..................... 182/87 |
| 991,863 | A | * | 5/1911 | Macomber ............... F16M 7/00 248/205.1 |
| 1,260,123 | A | | 3/1918 | Areson et al. |
| 1,399,747 | A | | 12/1921 | Chadwick et al. |
| 1,566,551 | A | | 12/1925 | MA Ghrand |
| 1,577,842 | A | | 3/1926 | Murphy et al. |
| 1,596,346 | A | * | 8/1926 | Gibson .................... A47B 5/04 211/104 |
| RE18,402 | E | | 3/1932 | Bebb |

(Continued)

OTHER PUBLICATIONS http://www.smartclima.com/air-conditioner-bracket-welded-t-type.htm SmartClima Dec. 23, 2011.*

(Continued)

Primary Examiner — Ingrid M Weinhold
(74) Attorney, Agent, or Firm — Dentons US LLP; Brian R. McGinley; Roman Tsibulevskiy

(57) ABSTRACT

A wall mount bracket for HVAC Equipment such as a heat pump, AC condensing unit, and preferably the exterior condenser unit of a mini split system. The system can advantageously be used in colder climates to prevent equipment from freezing and keep equipment above the level of the snow, etc. The wall mounts herein employ an offset to space the unit away from the wall of the structure to provide clearance on the rear of the unit. The offset also allows the units to be mounted above the top of the foundation wall without disrupting the exterior siding of the structure.

12 Claims, 15 Drawing Sheets

(56) References Cited

U.S. PATENT DOCUMENTS

| | | | |
|---|---|---|---|
| 1,872,525 A | 8/1932 | Taylor et al. | |
| 1,889,811 A | 12/1932 | Richardson et al. | |
| 1,911,727 A * | 5/1933 | Tisdale | A47B 96/061 |
| | | | 119/533 |
| 1,914,967 A | 6/1933 | Bebb et al. | |
| 2,582,385 A | 1/1952 | Knudsen et al. | |
| 2,729,411 A | 1/1956 | Lewis et al. | |
| 2,844,428 A | 7/1958 | Puntenney et al. | |
| 2,889,128 A | 6/1959 | Martin et al. | |
| 2,905,232 A | 9/1959 | Umphred et al. | |
| 2,954,958 A | 10/1960 | Benjamin et al. | |
| 2,992,001 A | 7/1961 | Ferris et al. | |
| 3,096,781 A | 7/1963 | Roidt et al. | |
| 3,104,737 A | 9/1963 | Fork et al. | |
| 3,190,208 A | 6/1965 | Styne et al. | |
| 3,493,201 A | 2/1970 | Marran et al. | |
| 3,494,478 A | 2/1970 | Link et al. | |
| 3,498,654 A | 3/1970 | Diaz et al. | |
| 3,534,933 A * | 10/1970 | Zimmerman | A47F 9/04 |
| | | | 108/152 |
| 3,540,175 A | 11/1970 | Hawn et al. | |
| 3,575,366 A | 4/1971 | Blum et al. | |
| 3,735,951 A | 5/1973 | Reed | |
| 3,862,464 A | 1/1975 | Arens | |
| 3,942,752 A * | 3/1976 | Shaw | F16M 11/22 |
| | | | 248/310 |
| 3,945,462 A | 3/1976 | Griswold | |
| 3,955,511 A | 5/1976 | Bak | |
| 4,122,762 A | 10/1978 | Williams | |
| 4,159,814 A * | 7/1979 | Fibus | A47B 47/00 |
| | | | 108/108 |
| 4,194,325 A | 3/1980 | Chalpin, Jr. | |
| 4,319,421 A | 3/1982 | Diamond | |
| 4,325,486 A | 4/1982 | Neal | |
| 4,348,843 A | 9/1982 | Cairns et al. | |
| D266,827 S * | 11/1982 | Withrow | D18/59 |
| 4,424,908 A | 1/1984 | Davitz | |
| 4,441,583 A | 4/1984 | Vaught | |
| 4,630,550 A | 12/1986 | Weitzman | |
| 4,657,442 A | 4/1987 | Krings | |
| 4,682,453 A | 7/1987 | Holmgren | |
| 4,741,445 A | 5/1988 | Klein | |
| 4,899,497 A | 2/1990 | Madl, Jr. | |
| 4,909,350 A * | 3/1990 | Jacobs | E04G 5/06 |
| | | | 182/82 |
| 4,910,932 A | 3/1990 | Honigman | |
| 5,050,358 A | 9/1991 | Vladislavic | |
| 5,052,648 A | 10/1991 | Landau | |
| 5,064,161 A | 11/1991 | Anderson | |
| 5,067,685 A | 11/1991 | Johnston, Jr. | |
| D345,890 S | 4/1994 | Majors | |
| 5,308,037 A | 5/1994 | Gonzalez | |
| 5,351,926 A | 10/1994 | Moses | |
| 5,396,782 A * | 3/1995 | Ley | F16F 15/04 |
| | | | 248/636 |
| 5,407,171 A | 4/1995 | Gonzalez | |
| 5,442,885 A | 8/1995 | Laven et al. | |
| D363,944 S | 11/1995 | McCarter | |
| 5,603,187 A | 2/1997 | Merrin et al. | |
| 5,647,490 A * | 7/1997 | Hull | A47B 61/003 |
| | | | 108/29 |
| 5,660,637 A | 8/1997 | Dodge | |
| 5,741,030 A | 4/1998 | Moore et al. | |
| 5,820,092 A | 10/1998 | Thaler | |
| 5,946,875 A | 9/1999 | Jeanseau | |
| D416,152 S | 11/1999 | Payne | |
| 6,135,402 A * | 10/2000 | Hatano | F24F 1/62 |
| | | | 248/205.1 |
| 6,141,927 A | 11/2000 | Usui | |
| 6,145,678 A | 11/2000 | Morrison | |
| 6,286,691 B1 | 9/2001 | Oberhaus et al. | |
| 6,290,073 B1 | 9/2001 | Barnes, Sr. et al. | |
| 6,409,031 B1 | 6/2002 | Wynne | |
| D459,926 S | 7/2002 | Mikich et al. | |
| 6,435,105 B1 | 8/2002 | Mikich et al. | |
| 6,467,745 B1 * | 10/2002 | Sickels | F16M 11/10 |
| | | | 248/235 |
| D468,163 S | 1/2003 | Blake | |
| D470,353 S | 2/2003 | Mikich et al. | |
| 6,715,427 B2 | 4/2004 | Mikich et al. | |
| 6,719,247 B1 | 4/2004 | Botting | |
| 6,772,564 B2 | 8/2004 | Leon | |
| D499,284 S | 12/2004 | Rafoth et al. | |
| 6,834,768 B2 | 12/2004 | Jersey et al. | |
| 6,866,579 B2 | 3/2005 | Pilger | |
| 6,976,663 B1 | 12/2005 | Faulk | |
| 7,037,030 B2 | 5/2006 | McLemore | |
| D525,811 S | 8/2006 | Nawrocki | |
| 7,083,151 B2 | 8/2006 | Rapp | |
| 7,152,535 B2 | 12/2006 | Mikich et al. | |
| 7,174,686 B1 | 2/2007 | Legband | |
| 7,228,669 B1 | 6/2007 | Yaraschefski | |
| 7,261,256 B2 | 8/2007 | Pattie et al. | |
| D555,780 S | 11/2007 | Wanninger | |
| D559,090 S | 1/2008 | Nawrocki | |
| 7,350,458 B2 | 4/2008 | Leibowitz | |
| 7,410,335 B2 | 8/2008 | Scott et al. | |
| 7,445,188 B2 | 11/2008 | Lamparter | |
| 7,506,593 B2 | 3/2009 | Strabel | |
| D590,490 S | 4/2009 | Lary | |
| 7,596,962 B2 | 10/2009 | Karamanos | |
| 7,793,908 B1 | 9/2010 | Finegan, Jr. | |
| 7,798,341 B2 | 9/2010 | Richardson et al. | |
| 8,011,156 B1 | 9/2011 | Schwan | |
| 8,066,131 B2 | 11/2011 | Mansor et al. | |
| D651,043 S | 12/2011 | Sarnoff et al. | |
| 8,132,768 B2 | 3/2012 | Fernandez et al. | |
| 8,167,260 B2 * | 5/2012 | Boccia | F24F 1/027 |
| | | | 248/208 |
| 8,245,651 B1 | 8/2012 | Mikich et al. | |
| 8,346,071 B2 | 1/2013 | Higashibara et al. | |
| 8,348,071 B1 | 1/2013 | Janlert | |
| 8,397,443 B2 | 3/2013 | Blom | |
| 8,511,486 B2 | 8/2013 | Mansor | |
| 8,628,050 B2 * | 1/2014 | Truckor | F16M 11/30 |
| | | | 182/82 |
| 8,640,420 B1 | 2/2014 | Halley | |
| 8,701,261 B2 | 4/2014 | Crowley | |
| 8,701,901 B2 | 4/2014 | Gregory et al. | |
| 8,783,633 B2 * | 7/2014 | Truckor | F16M 11/30 |
| | | | 182/82 |
| 8,827,232 B2 | 9/2014 | Crowley | |
| D720,607 S * | 1/2015 | Kats | D8/380 |
| 9,010,553 B2 | 4/2015 | Crowley | |
| 9,052,120 B2 * | 6/2015 | Villar | F24F 13/32 |
| 9,103,486 B2 | 8/2015 | Crowley et al. | |
| 2001/0023563 A1 | 9/2001 | Phillips | |
| 2002/0023888 A1 | 2/2002 | Wynne et al. | |
| 2002/0043189 A1 | 4/2002 | Mikich et al. | |
| 2002/0066237 A1 | 6/2002 | Stevenson et al. | |
| 2003/0052073 A1 * | 3/2003 | Dix | A47B 57/48 |
| | | | 211/90.02 |
| 2003/0132251 A1 | 7/2003 | Varney | |
| 2003/0164347 A1 | 9/2003 | Bouvier | |
| 2004/0140412 A1 | 7/2004 | Hendzel et al. | |
| 2004/0182025 A1 | 9/2004 | Moutsokapas et al. | |
| 2004/0182291 A1 | 9/2004 | Mikich et al. | |
| 2004/0222179 A1 | 11/2004 | Garcia | |
| 2005/0188903 A1 | 9/2005 | Ryberg | |
| 2006/0016078 A1 | 1/2006 | Bladow et al. | |
| 2006/0070967 A1 | 4/2006 | Schaubeck et al. | |
| 2007/0007223 A1 | 1/2007 | Thrush et al. | |
| 2007/0040074 A1 | 2/2007 | Humber et al. | |
| 2007/0062896 A1 | 3/2007 | Richardson et al. | |
| 2007/0062897 A1 | 3/2007 | Lawrence | |
| 2007/0119805 A1 | 5/2007 | Nawrocki | |
| 2007/0145222 A1 | 6/2007 | Rausch | |
| 2007/0205169 A1 | 9/2007 | Fratilla | |
| 2007/0246434 A1 | 10/2007 | Adams et al. | |
| 2008/0163573 A1 | 7/2008 | Wendelburg et al. | |
| 2009/0095856 A1 | 4/2009 | Nakatani | |
| 2009/0255889 A1 | 10/2009 | Geffe | |
| 2010/0006526 A1 | 1/2010 | Konstant | |

(56) References Cited

U.S. PATENT DOCUMENTS

| | | |
|---|---|---|
| 2010/0132286 A1 | 6/2010 | Hovey, Jr. |
| 2010/0223877 A1 | 9/2010 | O'Hara et al. |
| 2010/0228377 A1 | 9/2010 | D'Angelo et al. |
| 2010/0270448 A1* | 10/2010 | Boccia .................. F24F 1/027 248/208 |
| 2011/0023387 A1 | 2/2011 | Sweeney et al. |
| 2011/0072631 A1 | 3/2011 | Hartelius et al. |
| 2011/0073746 A1* | 3/2011 | Padiotis .................. F24F 1/50 248/674 |
| 2011/0186533 A1 | 8/2011 | Thrush et al. |
| 2011/0198461 A1* | 8/2011 | Truckor ................ F16M 11/30 248/205.1 |
| 2012/0153657 A1 | 6/2012 | Kapoor |
| 2012/0175331 A1 | 7/2012 | Yu |
| 2012/0180288 A1 | 7/2012 | Crowley |
| 2012/0181240 A1 | 7/2012 | Crowley |
| 2012/0193505 A1* | 8/2012 | Baron ...................... F24F 1/40 248/636 |
| 2013/0153726 A1* | 6/2013 | Truckor ................ F16M 11/30 248/235 |
| 2013/0221303 A1 | 8/2013 | Ash |
| 2013/0284686 A1 | 10/2013 | Robbins et al. |
| 2013/0306808 A1 | 11/2013 | Huang |
| 2014/0048678 A1 | 2/2014 | Chen et al. |
| 2014/0075980 A1 | 3/2014 | Villar |
| 2014/0312200 A1 | 10/2014 | Crowley |
| 2015/0090846 A1 | 4/2015 | Crowley |
| 2015/0107277 A1* | 4/2015 | Moore .................. F24F 1/027 62/77 |
| 2015/0275500 A1* | 10/2015 | Dalla .................. E04D 12/004 52/506.01 |

OTHER PUBLICATIONS http://www.aconsale.com/slim123/minisplitinstallkit.html Advance Infortech Inc. Dec. 11, 2014.*

Diamond Storage Concepts LLC, HyLoft 42"X42" Storage Unit #00808 Assembly Instructions in English and Spanish, 8 pages (date unknown).

Diamond Storage Concepts LLC, HyLoft 60"x"45" Storage Unit #00626 Assembly Instructions, 6 pages (2007).

Diamond Storage Concepts LLC, HyLoft Fully Adjustable Ceiling Storage Rack Assembly Instructions, 5 pages (2006).

Hyloft Ceiling Storage Products, http://www.hyloft.com/ceiling-storage/, Retrieved from the Internet Aug. 8, 2014.

* cited by examiner

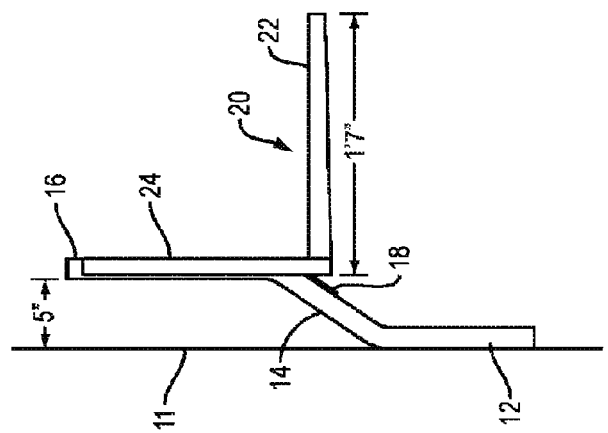
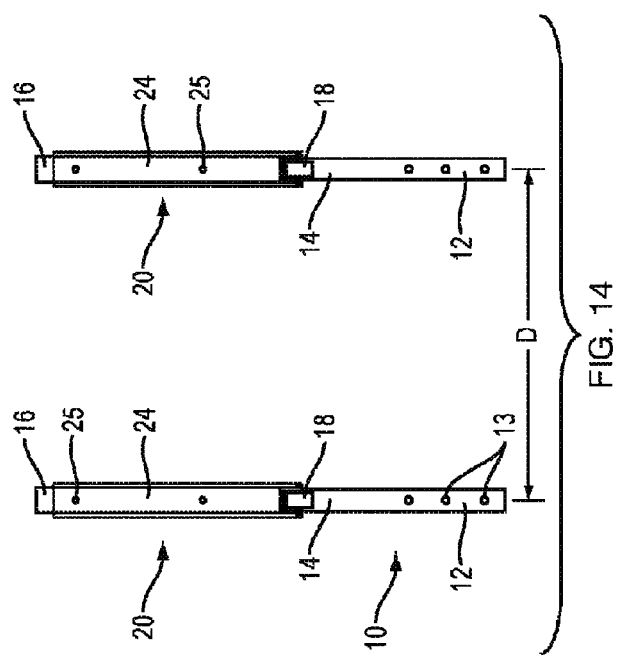
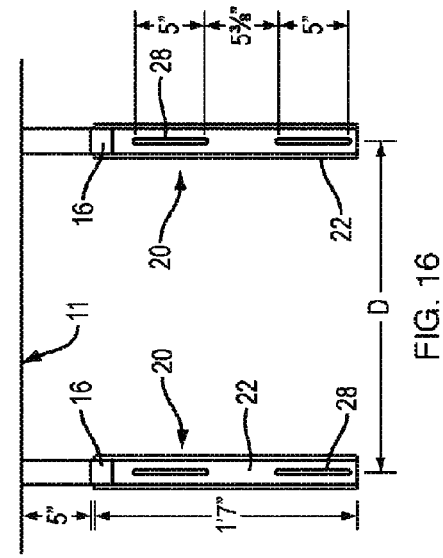

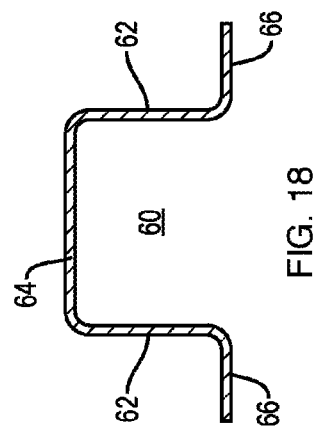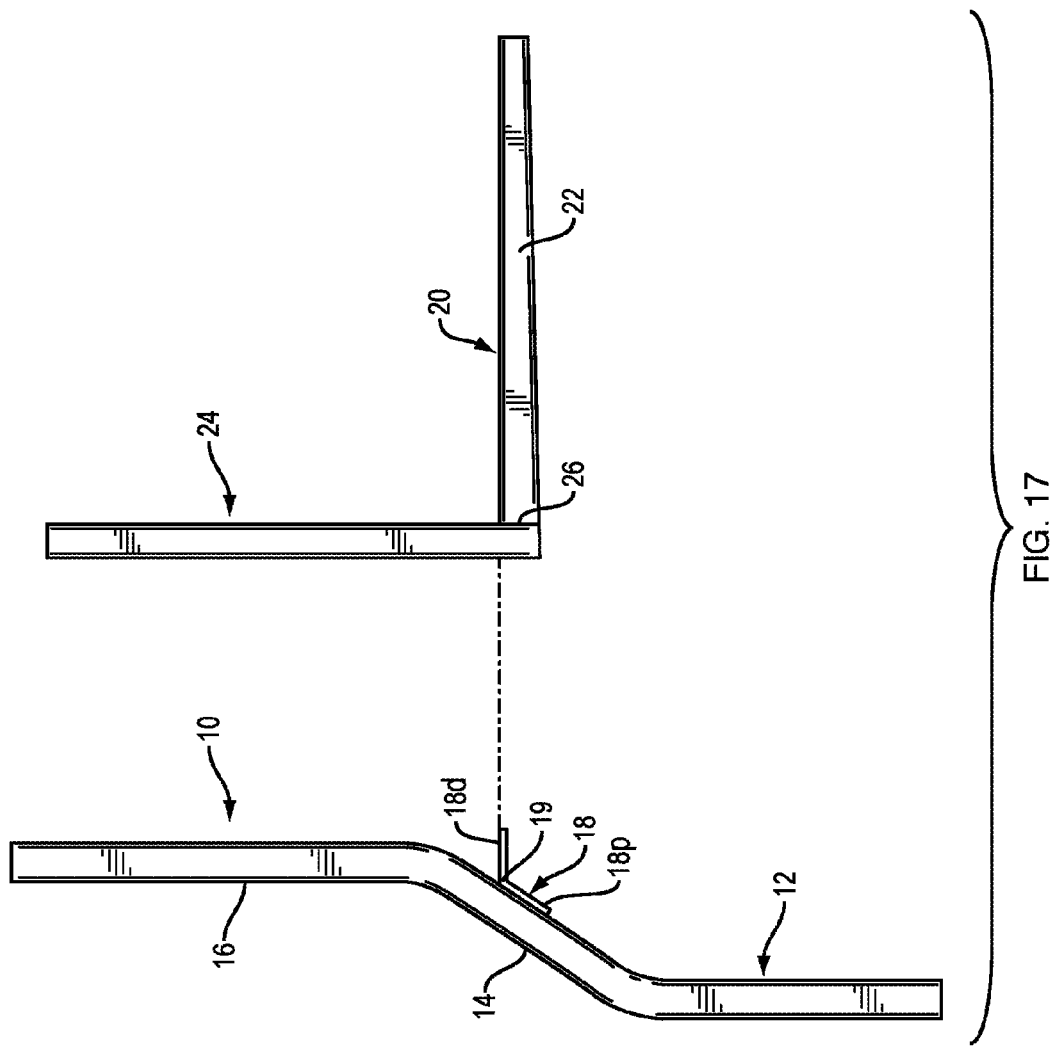

US 10,113,769 B2

WALL MOUNT BRACKET FOR OUTDOOR EQUIPMENT

CROSS REFERENCE TO RELATED APPLICATION

This application claims the priority benefit of U.S. provisional application No. 62/072,507 filed Oct. 30, 2014. The aforementioned provisional is incorporated herein by reference in its entirety.

BACKGROUND

The present invention relates generally to a mounting bracket and, more particularly, to a wall mounted bracket for an outdoor appliance such as an outdoor component of a heating and/or cooling system. The bracket herein may advantageously be used in connection with a heating and/or cooling system such as the outdoor condensing unit of a split system, especially a compact or so-called mini split system, and will be described primarily by way of reference thereto. It will be recognized, however, that the present mounting system may be used for all manner of equipment including air conditioning condensers/compressors, electrical transformers, and so forth.

Mini split air handling systems such as air conditioners or heat pumps locate the compressor and condenser outside the house or other structure to be heated or cooled. Such systems eliminate the need for extensive duct work in the structure by using thin copper tubing to pump a refrigerant to wall mounted blowers inside the structure (ductless) or to compact duct units that allow the evaporator to be hidden while requiring minimal ductwork.

Commonly, the outdoor condensing units are set on a pad outside the structure, such as a poured concrete slab or a prefabricated pad. In addition to requiring significant site preparation, the use of slabs are commonly very low to the ground, e.g., a few inches above grade, making their use impractical in areas receiving significant snowfall or having a high water table. Units set on a slab or pad are also susceptible to weed/plant growth around the unit, accumulation of leaves, damage from mowers or weed trimmers, and so forth.

The present disclosure contemplates a new and improved mounting apparatus and method which overcomes the above-referenced problems and others.

SUMMARY

A support apparatus for attaching equipment to a wall of a structure includes first and second of angled bracket arms configured to be mounted side by side in spaced apart relation. Each of the first and second angled bracket arms includes a lower portion configured to be attached to a foundation of the structure; an angled portion extending from the lower portion along a direction angled from an extending direction of the lower portion; and an upper portion extending from the angled portion along a direction generally parallel to the extending direction of the lower portion.

In one aspect, an equipment support arm is supported on each of the first and second angled bracket arms, the equipment support arm including a horizontal member secured at a generally right angle to a vertical member, wherein the vertical member is removably attached to the upper portion of a respective one of the first and second angled bracket arms.

In another aspect, an upper support member is attached to the upper portion, the upper support member including a proximal portion extending from the upper portion along a direction parallel to an extending direction of the upper portion and a distal portion extending from the proximal portion along a direction angled from an extending direction of the proximal portion.

BRIEF DESCRIPTION OF THE DRAWING

The invention may take form in various components and arrangements of components, and in various steps and arrangements of steps. The drawings are only for purposes of illustrating preferred embodiments and are not to be construed as limiting the invention.

FIG. 14 is a front elevational view of an exemplary wall mounting system herein.

FIG. 15 is a side elevational view of the wall mounting system appearing in FIG. 14.

FIG. 16 is a top plan view of the wall mounting system appearing in FIG. 14.

FIG. 17 is an exploded view of the wall mounting system appearing in FIG. 14.

FIG. 18 depicts a preferred cross-sectional shape of the horizontal and vertical components of the L-shaped lower mounting arms.

DETAILED DESCRIPTION OF THE PREFERRED EMBODIMENTS

Figure 1:
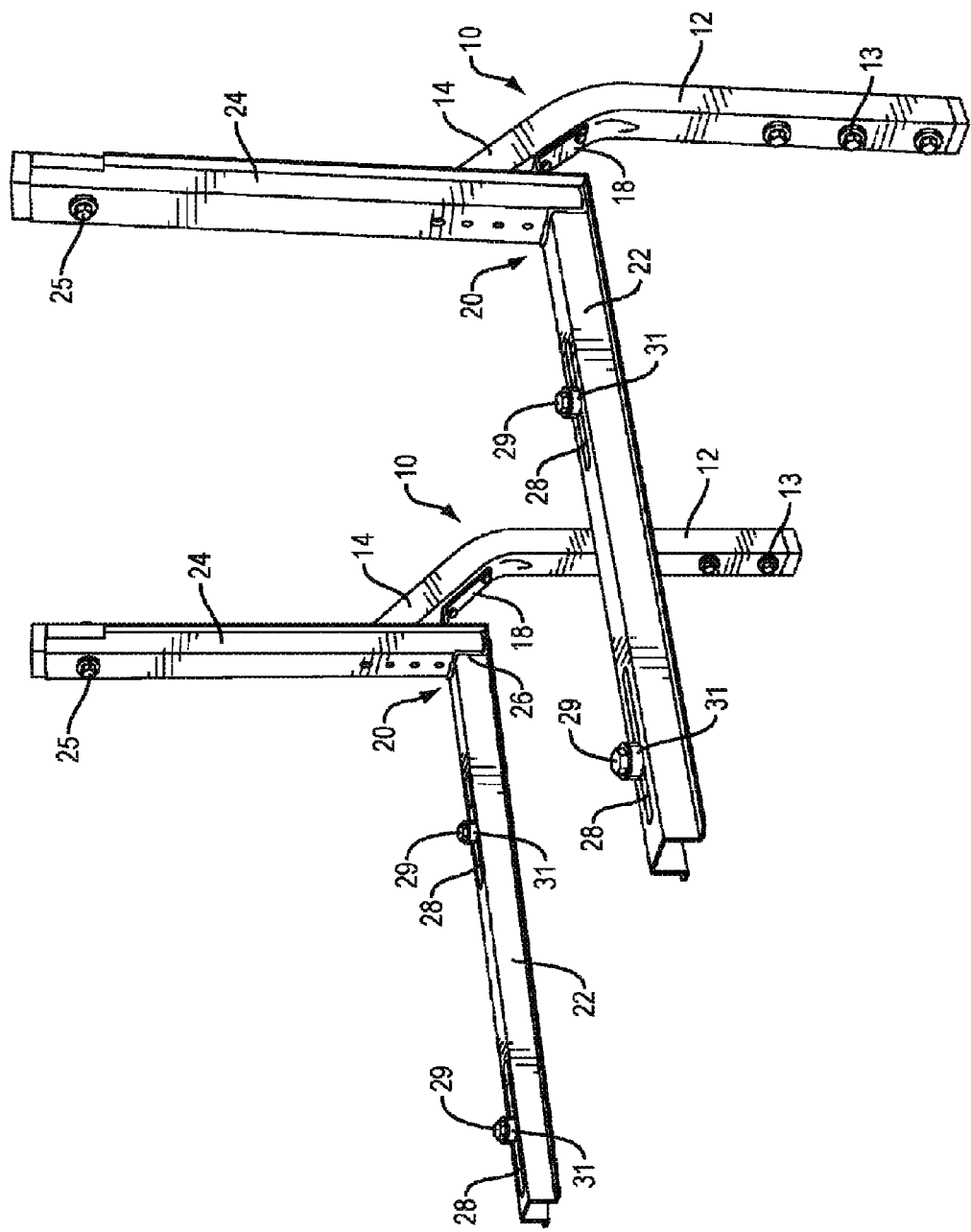
FIG. 1 is an image of a first exemplary wall mounting bracket embodiment, taken generally from the right side and the front.
Figure 2:
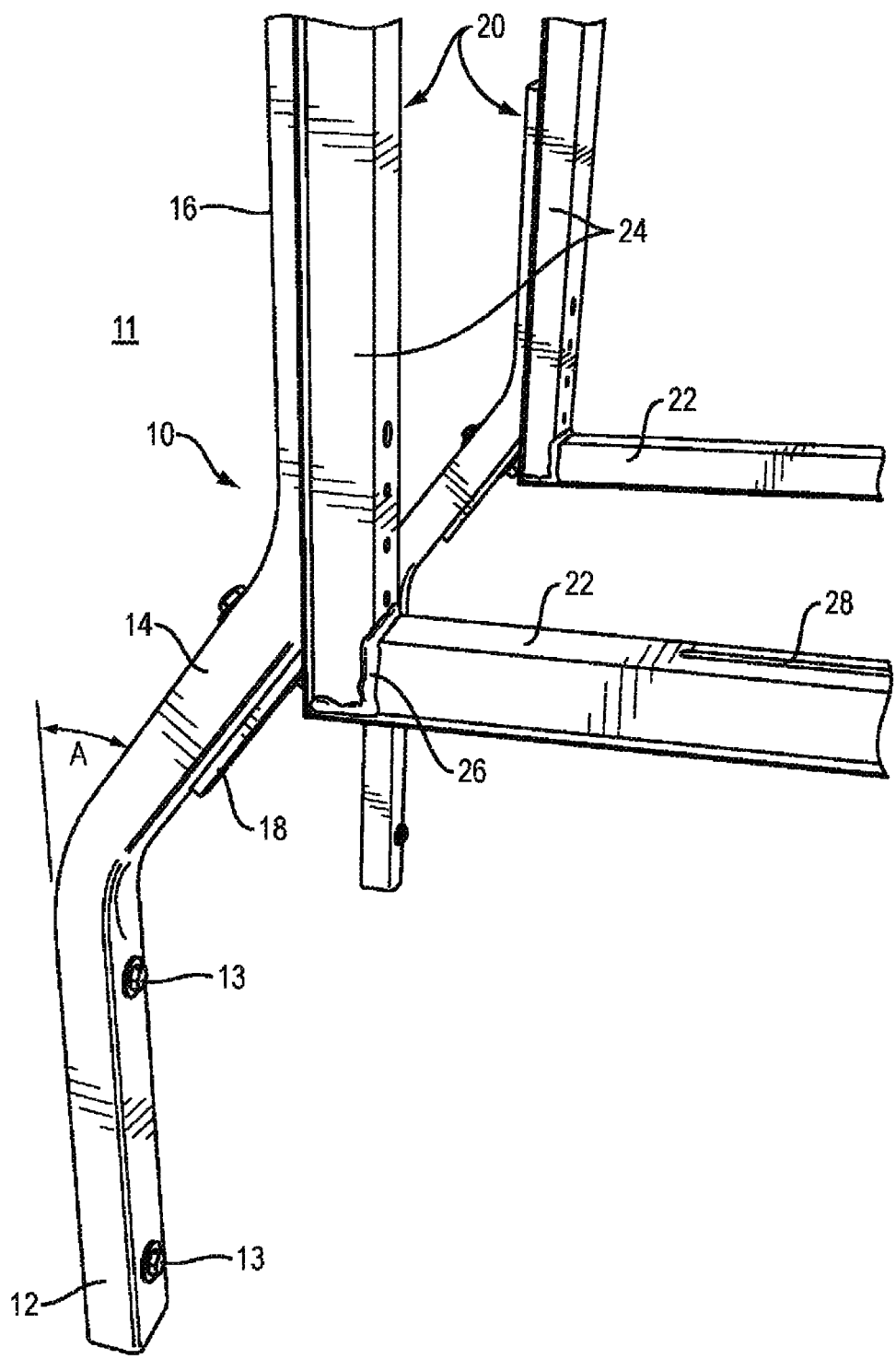
FIG. 2 is an image showing an enlarged, fragmentary view of a second exemplary wall mounting bracket embodiment, taken generally from the left side.
Figure 3:
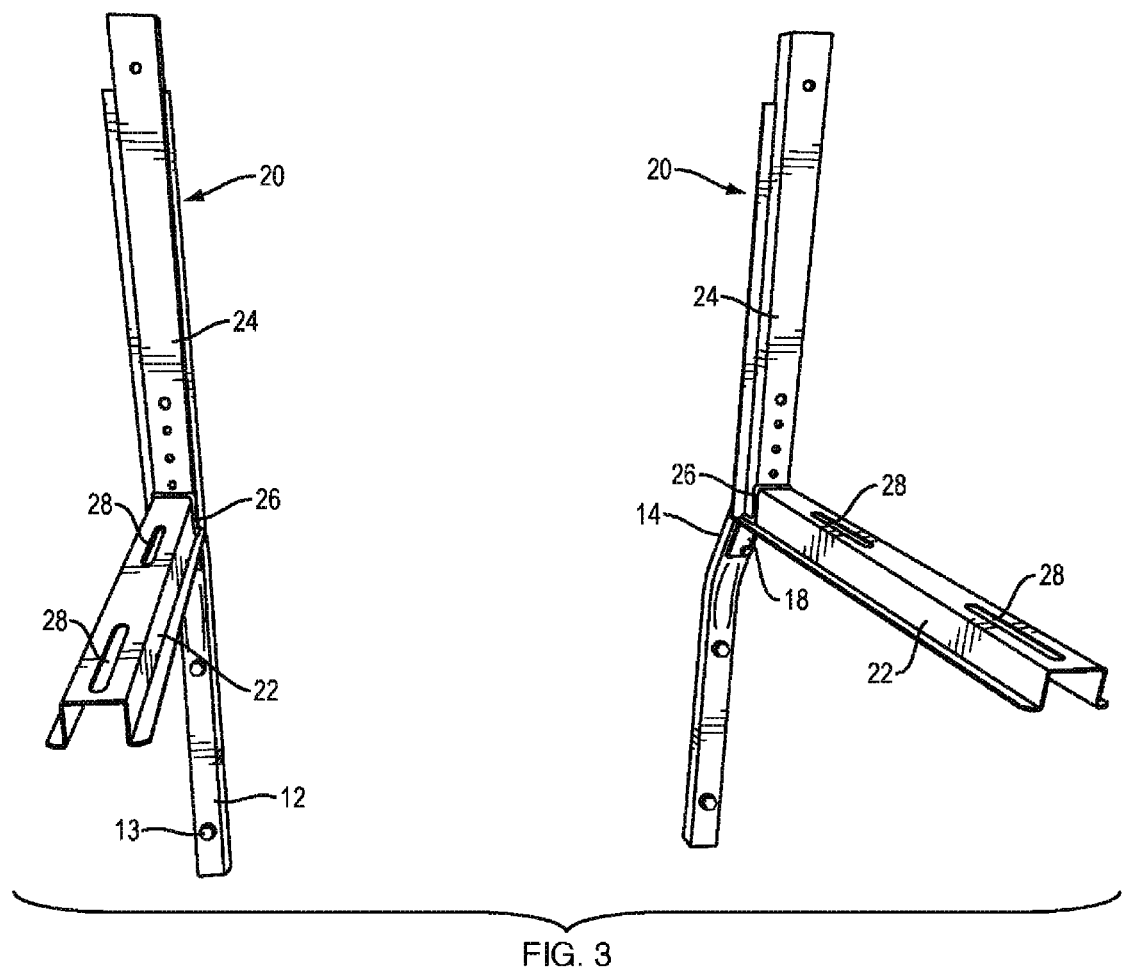
FIG. 3 is an image showing the embodiment appearing in FIG. 2, taken generally from the front.
Figure 4:
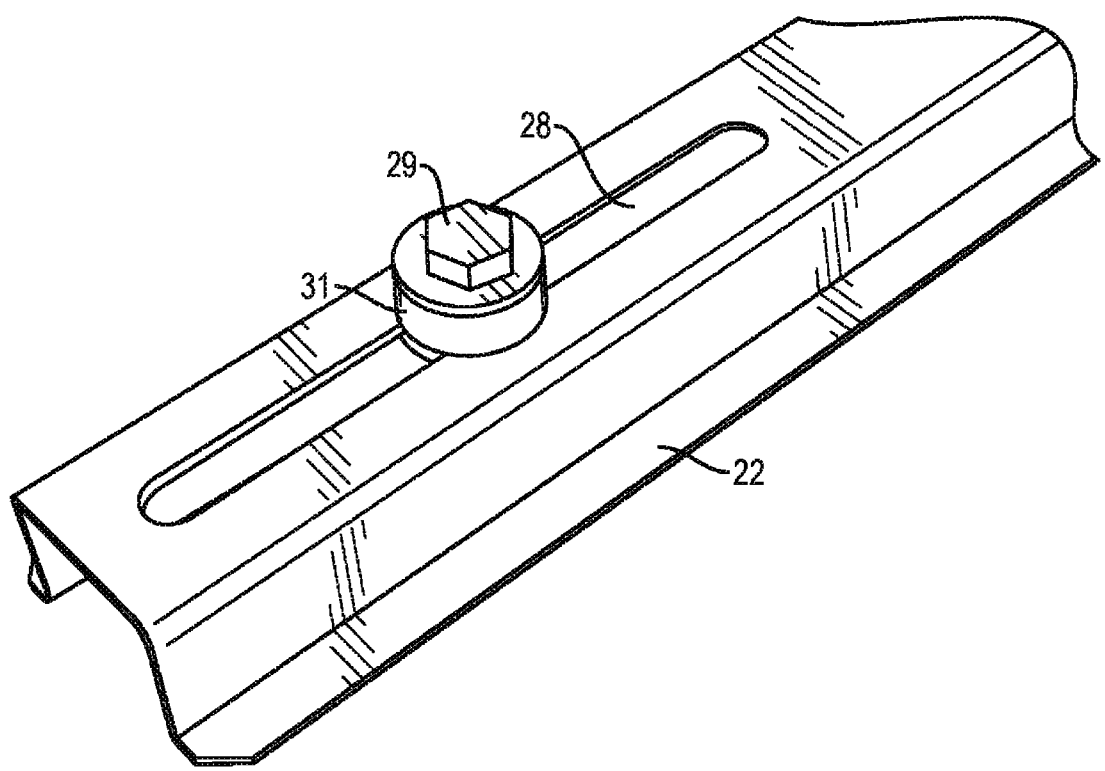
FIG. 4 is an enlarged, fragmentary view of the horizontal mounting arm showing the elongate hardware slot and exemplary fastener hardware with vibration isolator or dampener.
Figure 5:
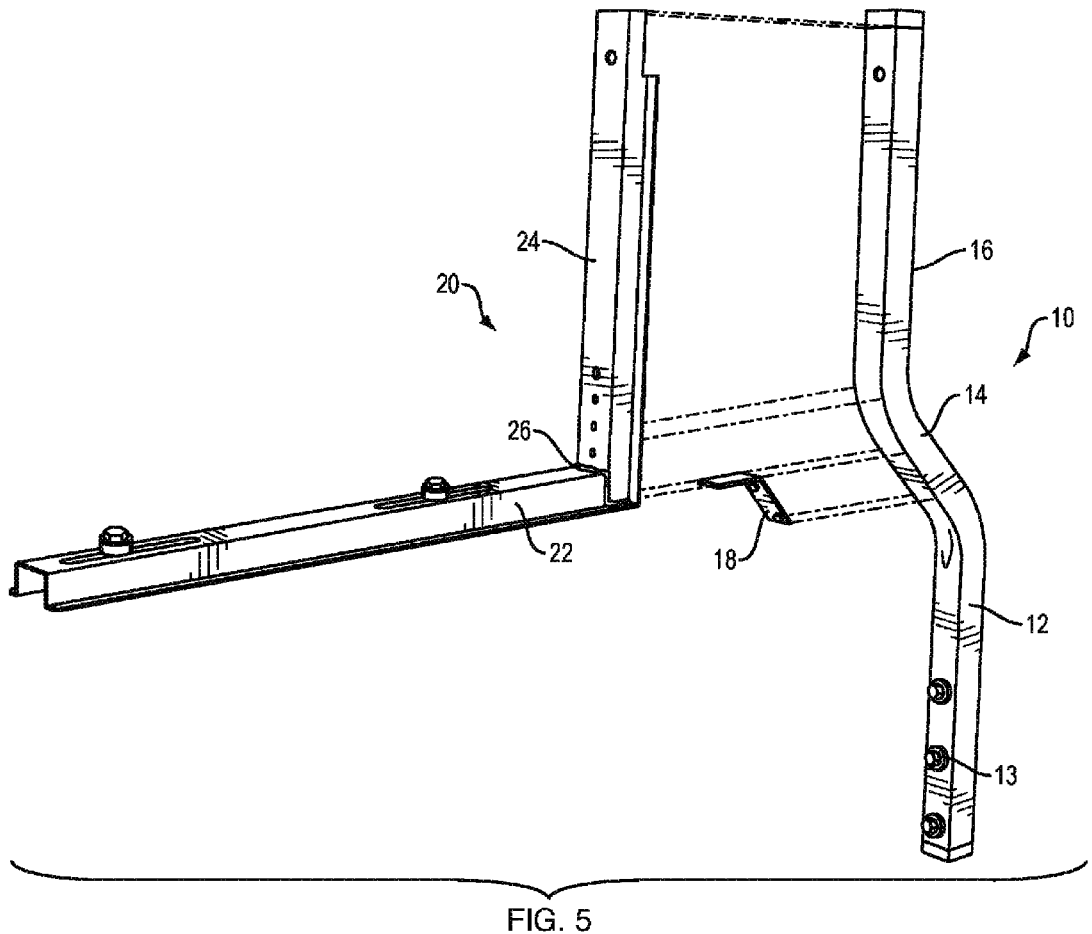
FIG. 5 is a partially exploded view of the embodiment appearing in FIG. 1.
Figure 6:
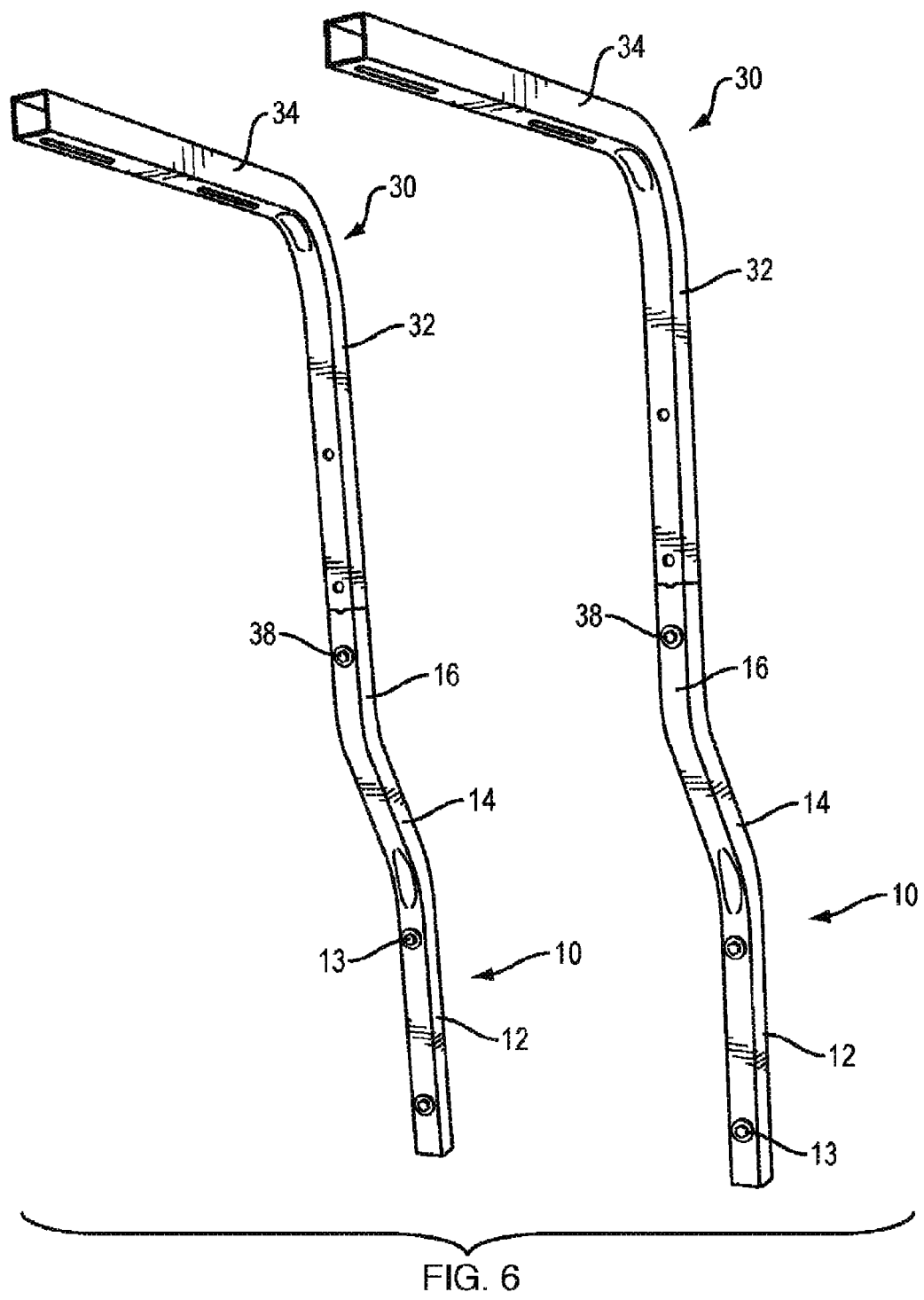
FIG. 6 is an image showing a perspective view of a third exemplary wall mounting bracket system herein, configured with upper mounting arms in place of lower mounting arms, taken generally from the front and right side.
Figure 7:
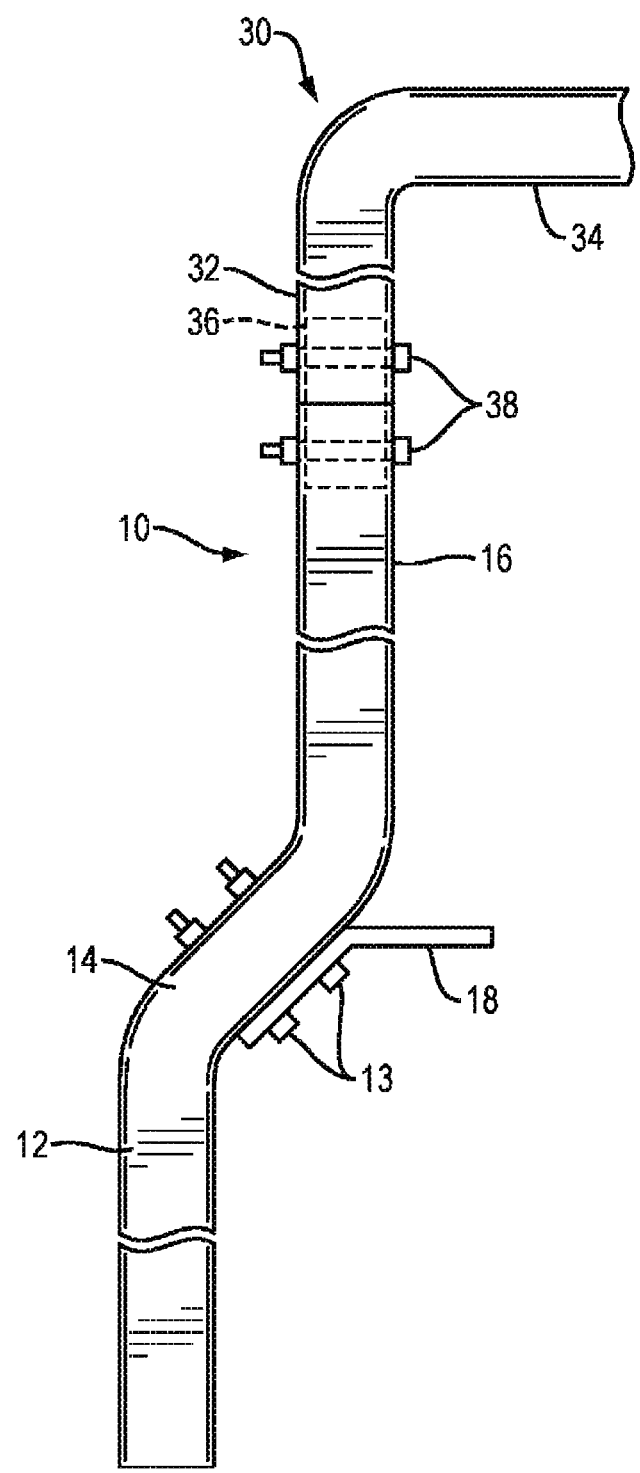
FIG. 7 is a fragmentary side view of a similar bracket embodiment configured for use with the upper mounting arms.
Figure 8:
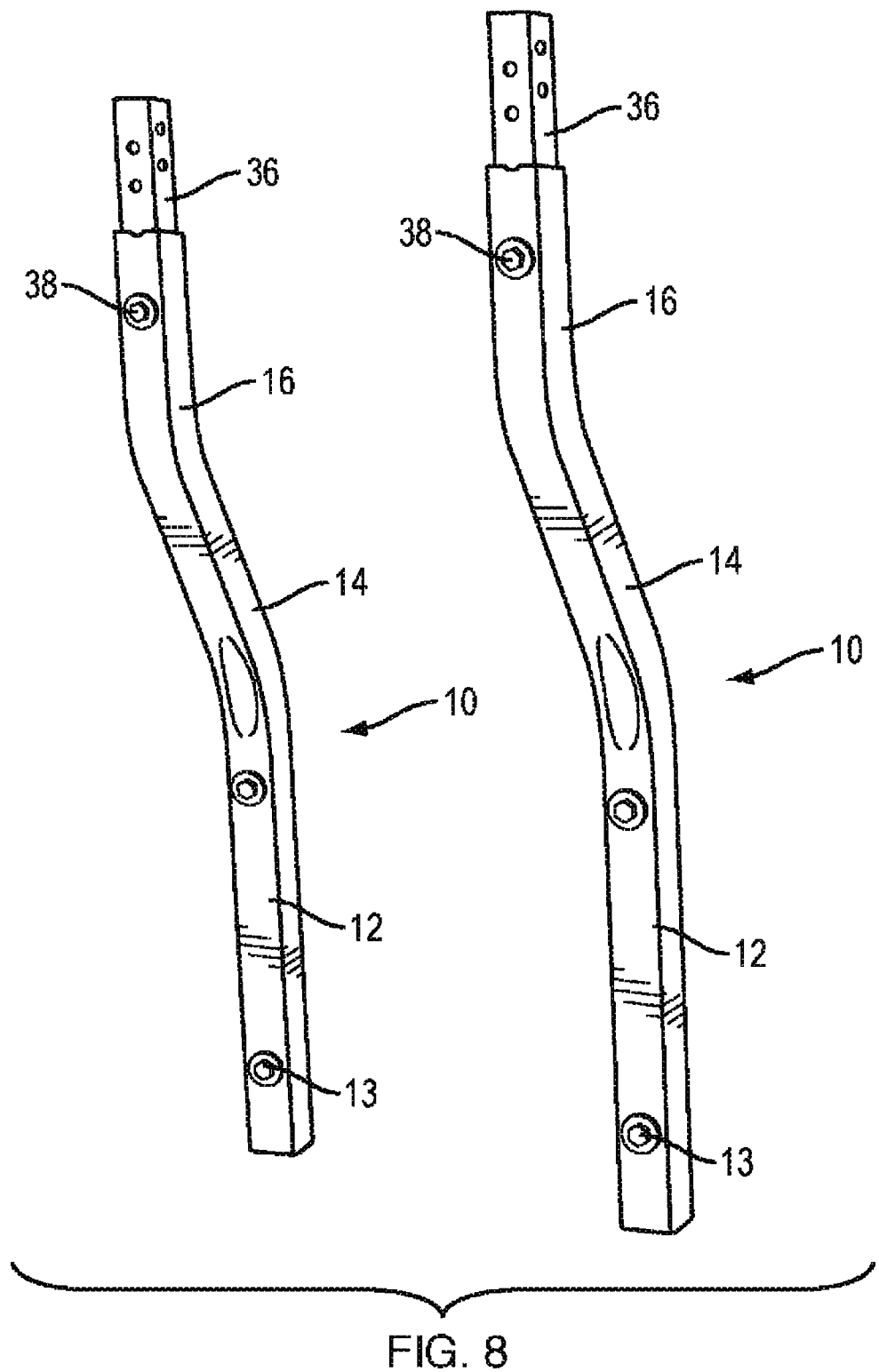
FIG. 8 is a perspective view of the embodiment appearing in FIG. 6, with the upper arms removed and illustrating the adapters.
Figure 9:
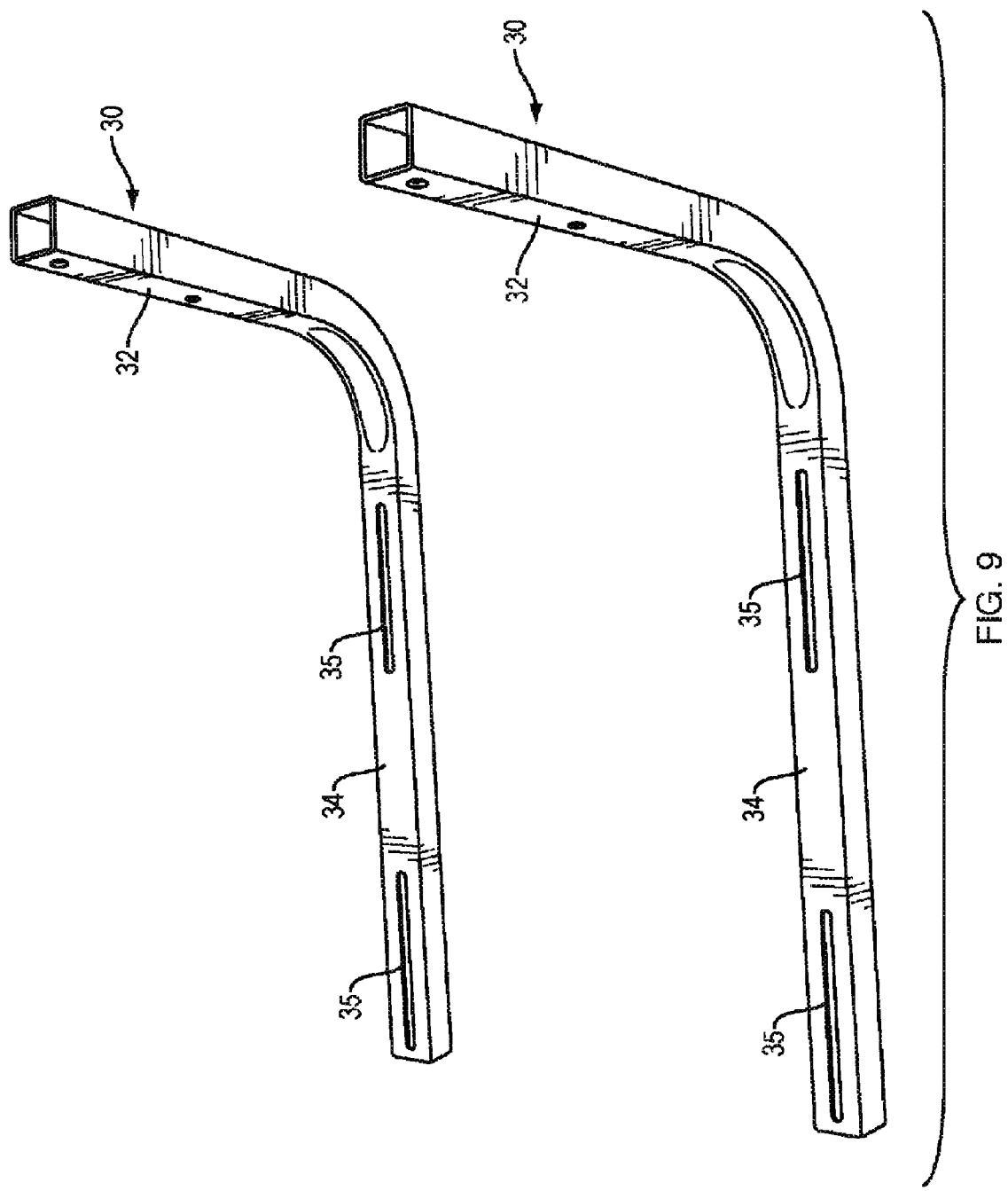
FIG. 9 is a perspective view of the upper mounting arms appearing in FIG. 6 removed from the wall mounted portion, taken generally from the bottom and side.
Figure 10:
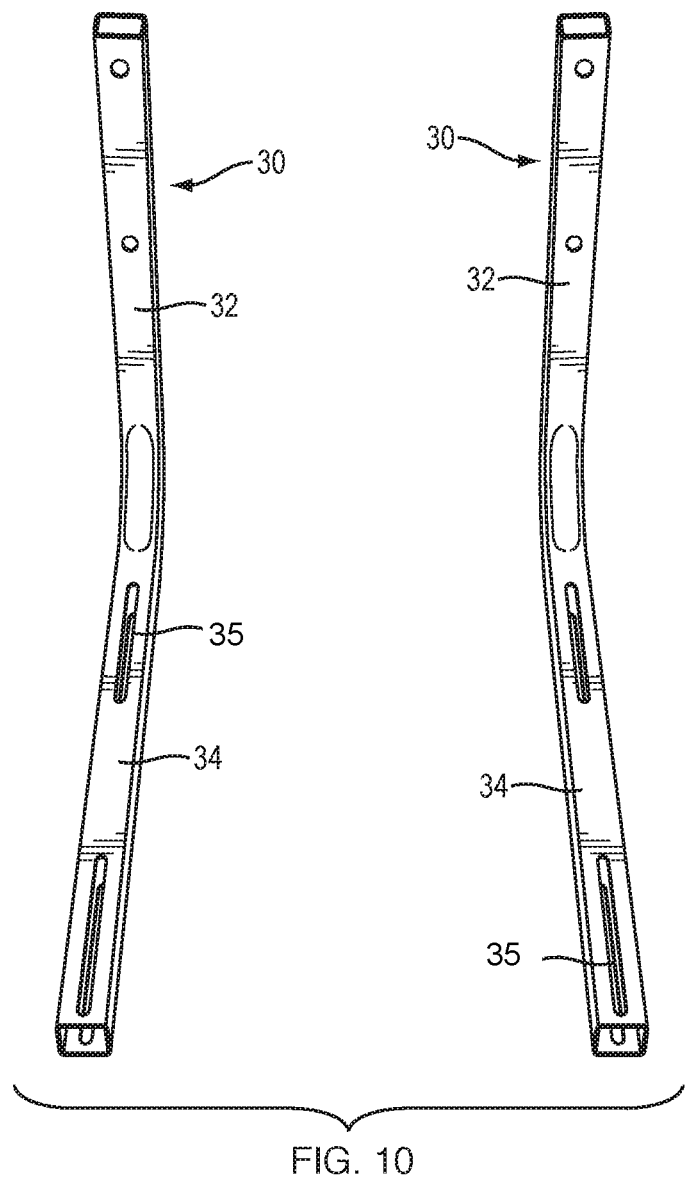
FIG. 10 is a perspective view of the upper mounting arms appearing in FIG. 9 taken generally from the front and bottom.

Referring now to the drawings, FIGS. 1-5 and 13-17 illustrate a wall mounted bracket system comprising a pair of angled bracket arms 10 mounted side by side and spaced apart any desired width D, which may be selected to accommodate the width of the equipment to be mounted. Although the present invention is described by way of reference to the preferred embodiment wherein two arms 10 are used, it will be recognized that any other number, such as 3, 4, 5, 6, 7, 8, etc., of arms 10 may be employed. The dimensions given in FIGS. 15 and 16 are exemplary only and are not intended to be limiting.

The bracket arms 10 are, for example, 2" or 1¾" square tubing, preferably steel, although bracket arms formed of other metal or metal alloy are also contemplated. Each bracket arm 10 includes a lower portion 12 for attaching to a foundation wall 11 and an angled portion 14 angled away from the wall. The angle A may be any angle in the range of from about 15 degrees to about 75 degrees and is preferably about 45 degrees). The arm 10 further includes an upper portion 16 which extends in a direction that is generally parallel to the extending direction of the lower portion, i.e., generally vertically from the upper end of the angled portion 14 and is spaced away from wall.

The bracket arms 10 may be formed by bending the metal tubing. When the lower portions 12 are secured to the exterior side of a foundation wall, the offset portions 14 and 16 can extend above the top of the foundation wall without the need to putting holes in the siding material of the building. The spacing also allows the units to be mounted in accordance with mandatory clearance requirements between the equipment and the building wall, provides room for piping and access for servicing the mounted equipment.

The lower portion 12 is bolted or anchored to the wall with threaded fasteners 13. A rigid plate, e.g., metal and preferably steel plate 18 extends along the lower or outward facing surface of the angled portion 14 and in certain embodiments includes a bend 19 to define a proximal portion 18p extending along and secured to the angled portion 14 and a distal portion 18d extending horizontally a distance from the proximal portion. The distal end of the plate 18d extends a distance sufficient to form a rest or shelf for a proximal end of a lower support arm 20. In certain embodiments, the lower support arms 20 are generally L-shaped and may be formed of bent or roll-formed sheet metal forming a channel with axial extending flanges on either side, i.e., having a generally top-hat shaped cross section.

As best seen in FIG. 18, the support arm vertical and horizontal members 22, 24 may be formed of a stock material having parallel axially extending side walls 62 and an axially extending web 64 extending between the parallel axially extending side walls 62, the parallel axially extending side walls 62 and the axially extending web 64 cooperating to define a channel 60. In the illustrated preferred embodiment, each of the support arm vertical and horizontal members 22, 24 further include axial, outwardly extending flanges 66 on the ends each of the parallel axially extending side walls 62 opposite the web 64, wherein the parallel axially extending side walls 62, axially extending web 64, and outwardly extending axial flanges 66 cooperate to define a structure having a generally top-hat shaped cross sectional shape.

Each lower support arm 20 has a horizontal member 22 and a vertical member 24 secured at right angles. The lower support arm vertical member 24 has a notch 26 cut out to receive the proximal end of the horizontal member 22, which extends into the channel defined by the vertical member and rests on the protruding, distal end portion of the bent plate 18. The proximal end of the plate 18 may be secured to the angled portion 14 via bolts, or, may be permanently secured thereto, e.g., via welding. In the illustrated preferred embodiment, the horizontal member 22 and the vertical member 24 are secured to each other by a welded joint.

Elongated openings 28 are provided in the upper surface of the horizontal member 22 to accommodate mounting hardware such as bolts 29 to attach the condensing unit to the arms 22. In the preferred embodiments, vibration absorbing couplings 31 are disposed between the condensing unit (not shown) and the arm horizontal member 22 to absorb vibration and noise emanating from the condenser to prevent or reduce amplification of such noise and vibration by the bracket arms 10 and to prevent or reduce transmission of such noise or vibration to the house of other structure to which the bracket arms 10 are mounted.

The vibration absorbing coupling members 31 may be formed of a material which is resilient, flexible, compressible, deformable, compliant, and/or elastic, and is preferably a polymeric material. Most preferably, the coupling member 31 is formed of an elastomeric material, such as a synthetic or natural elastomeric or rubber material. Exemplary elastomeric materials which may be used in making the coupling member include, for example, polyurethane, polyisoprene, polybutadiene, neoprene, butadiene-acrylonitrile copolymers, ethylene-butadiene block copolymers, ethylene-propylene based copolymers, natural rubber, polychloroprene rubber, polyisoprene-isobutylene copolymers, silicone rubber, styrene-acrylonitrile copolymers, styrene-butadiene copolymers, styrene-isoprene copolymers, styrene-maleic anhydride copolymers, fluoroelastomers, polyolefins, and so forth.

The vertical members 24 are bolted to the upper portion 16 of the bracket arms with threaded fasteners 25. The channel shape of the support arms 20 defines a channel that is sized to receive the upper portion 16 of the bracket arm 10.

Figure 13:
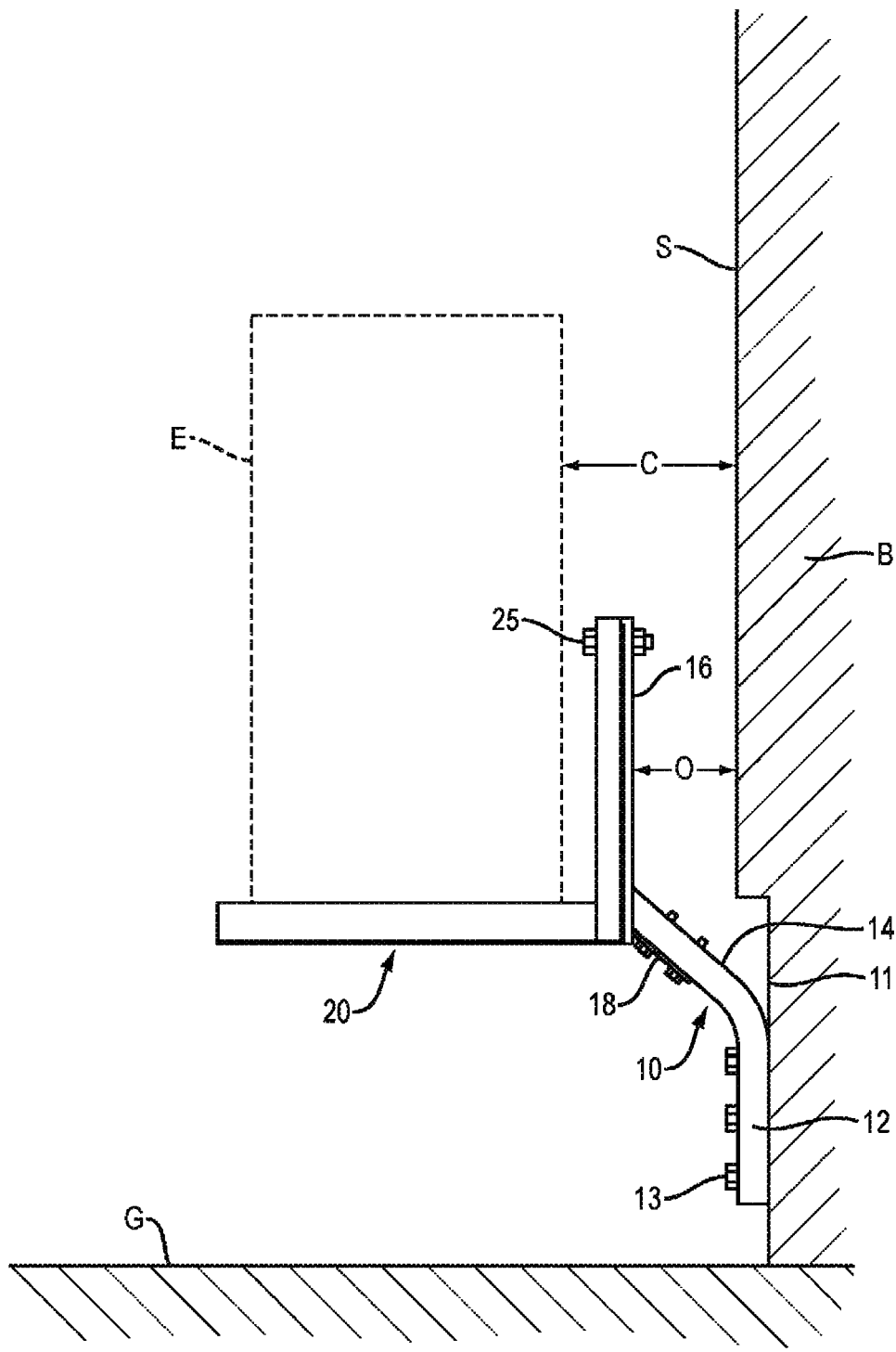
FIG. 13 shows an exemplary installation on an exterior wall of a building.

Although the bracket arms 10 can be adapted for use with any wall of a structure where it is desired to mount equipment, as best seen in FIG. 13, the bracket arms 10 support arms 20 are advantageous for supporting equipment E above ground or grade level G, and are particularly advantageous for supporting the equipment E configured for secure attachment to an exterior surface of a foundation wall 11 of a structure or building B without the need to penetrate, remove, or otherwise interfere without exterior siding or wall cladding S applied to the walls of the structure B above the level of the foundation 11. In addition, the horizontal offset O between the lower portion 12 and the upper offset portion 16 enables the equipment E to be mounted to provide a clearance distance C between the back of the equipment E and the wall of the structure B in accordance with minimum clearance distances as specified by building codes or other regulations.

Referring now to FIGS. 6-10 (and continued reference to FIGS. 1-5), upper support arms 30 can be attached to the bracket arms 10, either in addition to or as an alternative to the lower support arms 20. The upper support arms 30 include a vertical portion 32 and an angled portion 34. In certain embodiments, the angled portion extends generally horizontally, e.g., therein the angled portion 34 is configured to support equipment. In other embodiments, the angled portion may be sloped relative to horizontal, e.g., wherein the angled portion 34 is configured to support a roof over equipment beneath the roof. The angled portion 34 includes a plurality of elongated openings 35, similar to the elongated openings 28.

An adapter 36 is secured in the open upper end of the bracket upper portion 16. The adapter 36 may be formed of a segment of steel tubing having an outer diameter that is equal to the inner diameter of the bracket arm 10 and the upper support arm 30. For example, in the case of a bracket arm 10 and upper support arm 30 formed of square tubing having an outer diameter of 1¾ inches and an inner diameter of 1¼ inches, the adapter is formed of formed of square steel tubing having an outer diameter of 1¼ inches. Other diameter tubing materials are contemplated. The adapter can be bolted in place with threaded fasteners 38.

The upper support arms 30 each comprise an inverted L-shaped piece of tubing wherein the lower end is received over the protruding portion of the adapter 36 and bolted in place with the threaded fasteners 38. The upper arms 30 may be used to support a mini-split condenser or other piece of equipment at a higher elevation than is possible with the lower support arms 20. Alternatively, the upper support arms 30 could be configured to support a roof or canopy over equipment located between the arms 10.

The upper support arms 30 could support a variety of purposes, as follows:

Method 1:

In method 1, the device is used without the lower support arms 20 and the equipment to be mounted is mounted on the upper support arms.

Method 2:

In method 2, the device is used without the lower support arms 20 and the equipment to be mounted is mounted on the ground, e.g., on a concrete slab, prefabricated pad, stand, etc. The upper arms 30 support a roof or canopy over the equipment beneath it.

Method 3:

In method 3, the device is used with the lower support arms 20 and the equipment to be mounted is mounted on the lower support arms. The upper arms 30 support a roof or canopy over the equipment beneath it.

Method 4:

In method 4, the device is used with the lower support arms 20. A first piece of equipment to be mounted is mounted on the lower support arms and a second piece of equipment is mounted on the upper support arms.

Figure 11:
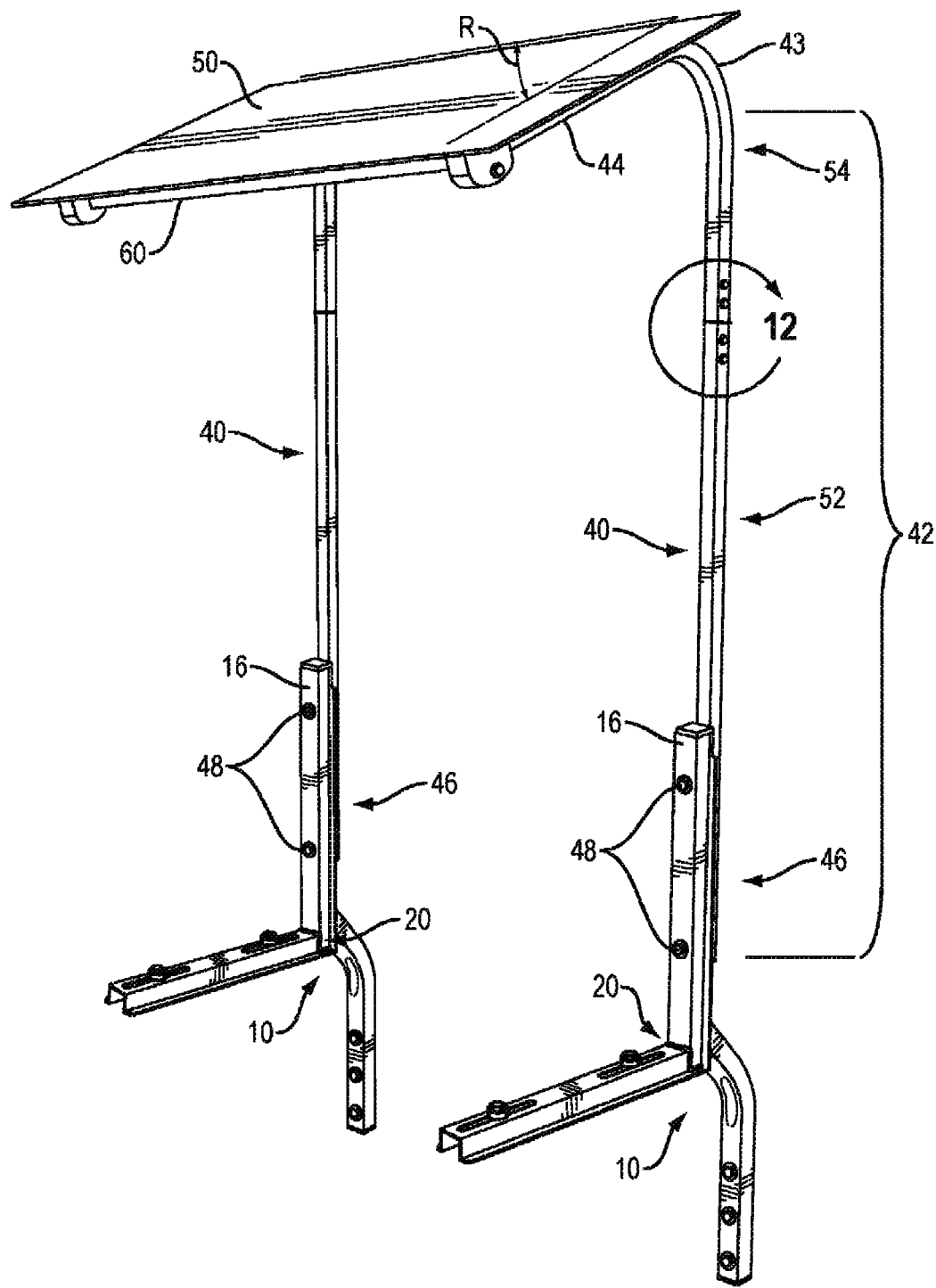
FIG. 11 is a perspective view of a further embodiment of the present invention including a roof supported over the wall mounting bracket.
Figure 12:
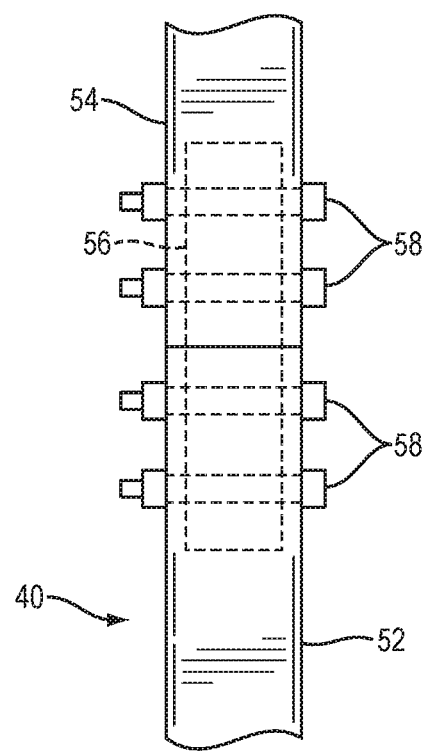
FIG. 12 is an enlarged front view of the region 12 appearing in FIG. 11.

Referring now to FIGS. 11 and 12, there is shown a further embodiment wherein a roof support member 40 is attached to the offset portion 16 with fasteners 48. Advantageously, the roof support members 40 are secured to the inward facing surface of the respective offset portions.

Although the embodiment appearing in FIGS. 11 and 12 is shown with the lower arms 20 attached to the bracket arms 10, in alternative embodiments the lower arms 20 can be omitted, e.g., wherein the roof support members are provided to support a roof 50 over equipment on the ground, a pad, slab, or stand beneath the roof 50.

Each roof support member 40 includes a vertical portion 42 and a roof support portion 44. The lower end 46 of the roof support member 40 is secured to the offset portion 16 via bolts or other fasteners 48. In the illustrated embodiment, the transition between the vertical portion 42 and the roof support portion 44 is a radiused bend 43, although a fastened joint e.g., a welded joint, between the portions 42 and 44 is also contemplated. In the embodiment shown the roof support portion 44 is angled downward by an angle R to allow snow and debris to slide off the roof 50. In alternative embodiments, a generally horizontal roof may be provided. In certain embodiments one or more transverse support members 60 are provided, which extend between the roof support portions 44 to support the roof and prevent the roof member 50 from sagging. The roof 50 may be formed from any rigid sheet material, including without limitation wood, metal, plastic, and so forth. In certain embodiments, the roof member 50 is formed of twin walled polycarbonate sheet material.

Each roof support member 40 may be a unitary structure or may comprise two or more segments attached together. In the illustrated embodiment, the roof support member 40 includes a lower straight member 52 and an upper angled member 54. In this manner, a modular system can be provided wherein straight members 52 of different lengths can be provided wherein the length of the straight members 52 can be selected to support the roof 50 a desired or appropriate height.

The attachment joint between the straight member 52 and the angled member 54 appears in FIG. 12 and includes an adapter 56 telescopically received within each of the abutting ends of the adjoining lower straight member 52 and upper angled member 54, and secured in position with bolts or other threaded fasteners 58.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A support apparatus for attaching equipment to a wall of a structure, the support apparatus comprising:

first and second angled bracket arms configured to be mounted side by side in spaced apart relation, each of the first and second angled bracket arms including:
a lower portion configured to be attached to a foundation of the structure;
an angled portion extending from the lower portion along a direction angled from an extending direction of the lower portion; and
an upper portion extending from the angled portion along a direction generally parallel to the extending direction of the lower portion; and first and second equipment support arms respectfully supported by the first and second angled bracket arms, each of the first and second equipment support arms including a horizontal member secured at a generally right angle to a vertical member, wherein each vertical member is removably attached to the upper portion of a respective one of the first and second angled bracket arms, each of the vertical and horizontal members for each of the first and second equipment support arms includes parallel axially extending side walls and an axially extending web extending between the parallel axially extending side walls, the parallel axially extending side walls and the axially extending web cooperating to define a channel; and a bent plate having a proximal end attached to an outward facing surface of one of the angled portions, and a distal end horizontally extending a distance from the proximal end, wherein a proximal end of the first equipment support arm's vertical member includes a notch formed in the respective axially extending web, the notch receiving the horizontal member of the first equipment support arm, the horizontal member of the first equipment support arm extending into the respective channel defined by the vertical member of the first equipment support arm and resting on the distal end of the bent plate.

2. The support apparatus of claim 1, wherein the angled bracket arms are formed of square metal tubing.

3. The support apparatus of claim 1, wherein at least one of the angled portions extends along a direction at an angle in the range of from about 15 degrees to about 75 degrees with respect to the extending direction of the respective lower portion.

4. The support apparatus of claim 3, wherein the angle is 45 degrees.

5. The support apparatus of claim 3, wherein the angle is selected to define a predetermined clearance between at least one of the upper portions and a wall of the structure.

6. The support apparatus of claim 1, wherein at least one of said upper portions is configured to extend above a top of a foundation wall of the structure when the respective lower portion is secured to the foundation wall.

7. The support apparatus of claim 1, further comprising a plurality of fasteners for securing at least one of the lower portions to a wall of the structure.

8. The support apparatus of claim 1, wherein each of the first and second support arm's vertical and horizontal members further include axial, outwardly extending flanges on each of the parallel axially extending side walls, wherein the parallel axially extending side walls, axially extending web, and outwardly extending flanges cooperate to define a structure having a generally top-hat shaped cross section.

9. The support apparatus of claim 1, wherein at least one of the first and second support arms is formed of a material selected from bent sheet metal and roll-formed sheet metal.

10. The support apparatus of claim 1, wherein at least one of the upper portions is removably received within the channel defined by one of the vertical members.

11. The support apparatus of claim 1, further comprising elongated openings formed in the upper surface of the horizontal member of at least one of the first and second equipment support arms and extending in an axial direction thereof, said elongated openings configured to accommodate mounting hardware for removably attaching the equipment.

12. The support apparatus of claim 11, further comprising one or more vibration absorbers disposed on each of the horizontal members for absorbing one or both of vibration and noise by the equipment.

\* \* \* \* \*